(12) United States Patent
Hsu et al.

(10) Patent No.: US 12,017,817 B2
(45) Date of Patent: Jun. 25, 2024

(54) CARRIER TRAY AND CARRIER TRAY ASSEMBLY USING THE SAME

(71) Applicants: Radiant(Guangzhou) Opto-Electronics Co., Ltd, Guangdong (CN); Radiant Opto-Electronics Corporation, Kaohsiung (TW)

(72) Inventors: Hung-Yi Hsu, Kaohsiung (TW); Hung-Lin Chou, Kaohsiung (TW); Chao-Hsu Chen, Kaohsiung (TW); Pei-Ling Kao, Kaohsiung (TW); Chih-Ming Chan, Kaohsiung (TW)

(73) Assignees: Radiant(Guangzhou) Opto-Electronics Co., Ltd, Guangdong (CN); Radiant Opto-Electronics Corporation, Kaohsiung (TW)

( * ) Notice: Subject to any disclaimer, the term of this patent is extended or adjusted under 35 U.S.C. 154(b) by 124 days.

(21) Appl. No.: 17/659,180

(22) Filed: Apr. 14, 2022

(65) Prior Publication Data
US 2022/0281636 A1 Sep. 8, 2022

Related U.S. Application Data

(63) Continuation of application No. PCT/CN2021/078922, filed on Mar. 3, 2021.

(51) Int. Cl.
*B65D 19/44* (2006.01)
*B65D 1/34* (2006.01)
*B65D 21/02* (2006.01)
*B65D 85/30* (2006.01)

(52) U.S. Cl.
CPC .............. *B65D 19/44* (2013.01); *B65D 1/34* (2013.01); *B65D 21/0209* (2013.01); (Continued)

(58) Field of Classification Search
CPC ............ B65D 21/0233; B65D 21/0209; B65D 85/30; B65D 1/34; B65D 25/00
(Continued)

(56) References Cited

U.S. PATENT DOCUMENTS

| 5,503,085 A | 4/1996 | Rozek |
| 6,510,801 B2 | 1/2003 | Tan |

(Continued)

FOREIGN PATENT DOCUMENTS

| CN | 1217279 A | 5/1999 |
| CN | 101434309 A | 5/2009 |

(Continued)

*Primary Examiner* — Robert J Hicks
*Assistant Examiner* — Sanjidul Islam
(74) *Attorney, Agent, or Firm* — CKC & Partners Co., LLC (57) ABSTRACT

A carrier tray and a carrier tray assembly using the same are described. The carrier tray includes a carrying portion, a surrounding wall and at least one recessed structure. The carrying portion has a top surface and a bottom surface opposite to the top surface. The surrounding wall is disposed around the carrying portion. The recessed structure is recessed into the carrying portion. The recessed structure has an opening and a recessed space, and the recessed space is communicated with the outside through the opening. There is a first distance defined by the recessed space along a first direction, and there is a second distance defined by the opening along the first direction. The first distance is greater than the second distance.

14 Claims, 9 Drawing Sheets

(52) U.S. Cl.
CPC ......... *B65D 21/0233* (2013.01); *B65D 85/30* (2013.01); *B65D 2519/0081* (2013.01)

(58) Field of Classification Search
USPC ....... 206/386, 449, 454, 455, 477, 557, 503, 206/505, 509, 511
See application file for complete search history.

(56) References Cited

U.S. PATENT DOCUMENTS

| | | |
|---|---|---|
| 2011/0042266 A1 | 2/2011 | Kasama |
| 2011/0226711 A1 | 9/2011 | Okanishi et al. |

FOREIGN PATENT DOCUMENTS

| | | | | |
|---|---|---|---|---|
| CN | 102320406 A | 1/2012 | | |
| CN | 204453129 U | 7/2015 | | |
| CN | 205034519 U | 2/2016 | | |
| CN | 205615954 U | 10/2016 | | |
| CN | 106882454 A | 6/2017 | | |
| CN | 208119653 U | 11/2018 | | |
| CN | 209455214 U | 10/2019 | | |
| CN | 214493762 U | 10/2021 | | |
| JP | H05170275 A | 7/1993 | | |
| JP | 2004149180 A | 5/2004 | | |
| JP | 2010076784 A | 4/2010 | | |
| KR | 20100046589 A | * | 5/2010 | ............... B65G 1/16 |
| KR | 20100046589 A | | 5/2010 | |
| RU | 128192 U1 | 5/2013 | | |
| TW | M523964 U | 6/2016 | | |
| TW | 202021880 A | 6/2020 | | |
| TW | I713135 B | 12/2020 | | |
| WO | 2005037524 A2 | 4/2005 | | |
| WO | 2012029217 A1 | 3/2012 | | |

* cited by examiner

CARRIER TRAY AND CARRIER TRAY ASSEMBLY USING THE SAME

RELATED APPLICATION

This application is a continuation application of International Application No. PCT/CN2021/078922 filed on Mar. 3, 2021, which is incorporated herein by reference.

BACKGROUND

Technical Field

The present invention relates to a carrier tray and its application, and more particularly, relates to a carrier tray and a carrier tray assembly.

Description of Related Art

A carrier tray is mainly used to carry electronic objects, such as backlight modules or monitors, and the carrier tray may be stacked with each other to achieve the objectives of space-saving and convenience of carrying.

Generally speaking, every electronic object is covered with a layer of protective film. After the electronic object is disposed on the carrier tray, the protective film is usually pressed by a carrying surface of the overlying carrier tray. However, the clamping area in this way is so small that the vertical pressing force is also less. Accordingly, the protective film may not be effectively fixed, thereby resulting in poor reliability of the overall packaging. On the other hand, the conventional carrier tray design mainly uses the vertical axis as a reference to stack one carrier tray on the adjacent carrier tray with a difference of 180 degrees to form a space for accommodating electronic objects, which spends more assembling time and cost.

SUMMARY

Accordingly, an objective of the embodiments of the present disclosure is to provide a carrier tray, which has a function of clamping and pressing protective films of carried objects, and can enhance the stability of the overall packaging and the assembling or packaging efficiency of production lines.

According to the aforementioned objective of the embodiments of the present disclosure, a carrier tray is provided. The carrier tray includes a carrying portion, a surrounding wall, and at least one recessed structure. The carrying portion has a top surface and a bottom surface opposite to the top surface. The surrounding wall is disposed around the carrying portion. The recessed structure is recessed into the carrying portion, the recessed structure has an opening and a recessed space, and the recessed space is communicated with the outside through the opening. A first distance is defined by the recessed space along a first direction, a second distance is defined by the opening along the first direction, and the first distance is greater than the second distance.

According to the aforementioned objective of the embodiments of the present disclosure, a carrier tray assembly is further provided. The carrier tray assembly includes at least two of the carrier trays stacked with each other. The recessed structure of one of the carrier trays is correspondingly stacked with the recessed structure of the adjacent carrier tray.

According to an embodiment of the present disclosure, the recessed structure has an inner wall, an outer wall, and a bottom. The recessed space is defined by the inner wall, the outer wall, and the bottom collectively, wherein the inner wall and the outer wall extend in a direction away from the bottom surface from the carrying portion, the bottom connects the inner wall and the outer wall, and the outer wall is closer to the surrounding wall than the inner wall. The bottom of one of the carrier trays is attached to the carrying portion of the adjacent carrier tray.

According to an embodiment of the present disclosure, a bottom surface of the bottom of each of the carrier trays is provided with a position limiting structure, and the position limiting structure of one of the carrier trays extends in a direction away from the carrying portion and is located in the recessed space of the recessed structure of the adjacent carrier tray.

According to an embodiment of the present disclosure, at least one of the inner wall and the outer wall further includes a first board portion, a second board portion, and a connection portion, the connection portion is connected between the first board portion and the second board portion, the first board portion is connected to the bottom, at least one portion of the recessed space is surrounded by the first board portion, an end of the connection portion is connected to the first board portion, an another end of the connection portion extends toward the recessed space, the second board portion is connected to the another end, and at least one portion of the opening is formed by surrounding of the second board portion. The connection portion, a second board portion, and a bottom surface of the carrying portion collectively form a supporting space, and a portion of the bottom of one of the carrier trays that is attached to the carrying portion of the adjacent carrier tray is located above the supporting space.

According to an embodiment of the present disclosure, the inner wall and the outer wall each includes a first board portion, a second board portion, and a connection portion connected between the first board portion and the second board portion. The first board portion of the inner wall is connected to the bottom, an end of the connection portion of the inner wall is connected to the first board portion of the inner wall, an another end of the connection portion of the inner wall extends toward the recessed space, and the second board portion of the inner wall extends from the carrying portion and is connected to the another end of the connection portion of the inner wall. The first board portion of the outer wall is connected to the bottom, an end of the connection portion of the outer wall is connected to the first board portion of the outer wall, an another end of the connection portion of the outer wall extends towards the recessed space, and the second board portion of the outer wall extends from the carrying portion and is connected to the another end of the connection portion of the outer wall. The first distance is defined between the first board portion of the inner wall and the first board portion of the outer wall, and the second distance is defined between the second board portion of the inner wall and the second board portion of the outer wall. The bottom of the recessed structure of one of the carrier trays completely covers the recessed space of the adjacent carrier tray.

According to an embodiment of the present disclosure, the inner wall and the outer wall each includes a first board portion, a second board portion, and a connection portion connected between the first board portion and the second board portion. The first board portion of the inner wall is connected to the bottom, an end of the connection portion of the inner wall is connected to the first board portion of the inner wall, an another end of the connection portion of the inner wall extends toward the recessed space, and the second board portion of the inner wall extends from the carrying portion and is connected to the another end of the connection portion of the inner wall. The first board portion of the outer wall is connected to the bottom, an end of the connection portion of the outer wall is connected to the first board portion of the outer wall, an another end of the connection portion of the outer wall extends towards the recessed space, and the second board portion of the outer wall extends from the carrying portion and is connected to the another end of the connection portion of the outer wall. The first distance is defined between the first board portion of the inner wall and the first board portion of the outer wall, and the second distance is defined between the second board portion of the inner wall and the second board portion of the outer wall. The connection portion the second board portion of the inner wall and the bottom surface of the carrying portion collectively form a first supporting space, the connection portion and the second board portion of the outer wall and the bottom surface of the carrying portion collectively form a second supporting space, wherein a portion of the bottom of one of the carrier trays that is attached to the carrying portion of the adjacent carrier tray is located above the first supporting space and the second supporting space.

According to an embodiment of the present disclosure, the surrounding wall is a bending structure, and a bottom surface of the bending structure has a crooked space. An exhausting passage is between at least two adjacent recessed structures on the bottom surface of the carrying portion. The surrounding wall of one of the carrier trays is disposed around the surrounding wall of the adjacent carrier tray.

According to an embodiment of the present disclosure, the carrying portion of one of the carrier trays and the carrying portion of the adjacent carrier tray collectively form an accommodating space.

According to an embodiment of the present disclosure, the carrier tray assembly further includes a protective film, the protective film is configured to cover a carried object located on the carrier tray, and the protective film located on one of the carrier tray is pressed and restrained by the recessed structure of the adjacent carrier tray.

According to an embodiment of the present disclosure, the bottom surface of the recessed structure of each of the carrier trays is provided with a position limiting structure, and the position limiting structure of one of the carrier trays is located in the recessed space of the recessed structure of the adjacent carrier tray and is in contact with the protective film located on the adjacent carrier tray.

It can be known from the above that the carrier tray of the present disclosure has the recessed structure, and through the design that the second distance of the opening of the recessed structure is smaller than the first distance of the recessed space, the bottom of the recessed structure of the upper carrier tray can be carried on the carrying portion of the lower carrier tray. As a result, in addition to providing a supporting function when the carrier trays are stacked with each other, the recessed structure further clamps the protective film covering carried objects to greatly increase the clamping area, such that the vertical pressing force is increased, thereby the fixing effect of the protective film is strengthened, and the assembling or packaging efficiency of production lines is further increased correspondingly.

BRIEF DESCRIPTION OF THE DRAWINGS

To more completely realize the embodiments and their advantages, reference is now made to the following description taken in conjunction with the accompanying drawings, wherein.

DETAILED DESCRIPTION

Figure 1:
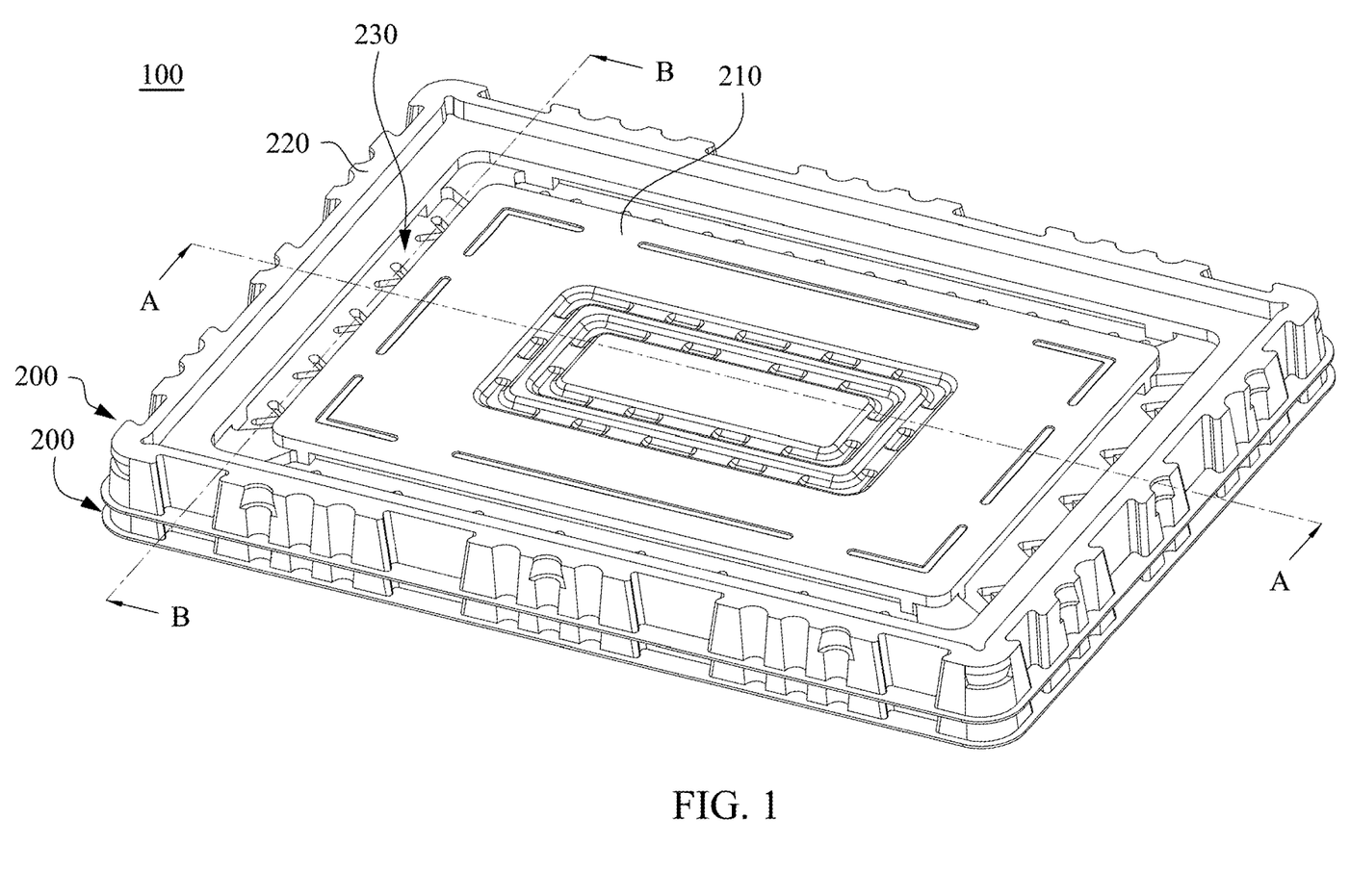
FIG. 1 is a structure schematic diagram showing a structure of a carrier tray assembly in accordance with an embodiment of the present disclosure.
Figure 4:
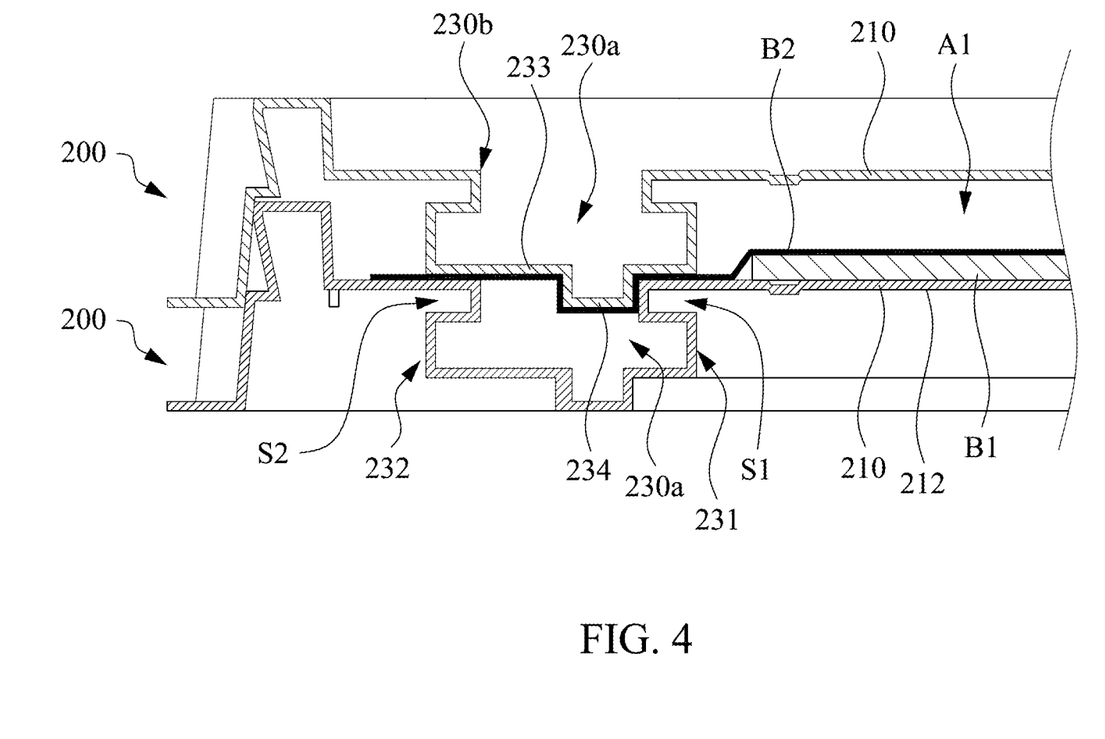
FIG. 4 is a schematic diagram showing a using state of a structure of the carrier tray in accordance with an embodiment of the present disclosure.

Referring to FIG. 1, FIG. 1 is a schematic diagram showing a structure of a carrier tray assembly in accordance with an embodiment of the present disclosure. The present embodiment mainly provides a carrier tray 200, the carrier tray 200 is mainly used to carry objects (for example, a carried object B1 as shown in FIG. 4), and the carrier tray 200 may be stacked with each other to form a carrier tray assembly 100. In the present embodiment, the carrier tray 200 not only has functions of carrying and being stacked with each other, but also has a function of clamping and limiting a protective film B2 covering the carried object B1 (as shown in FIG. 4).

Figure 2A:
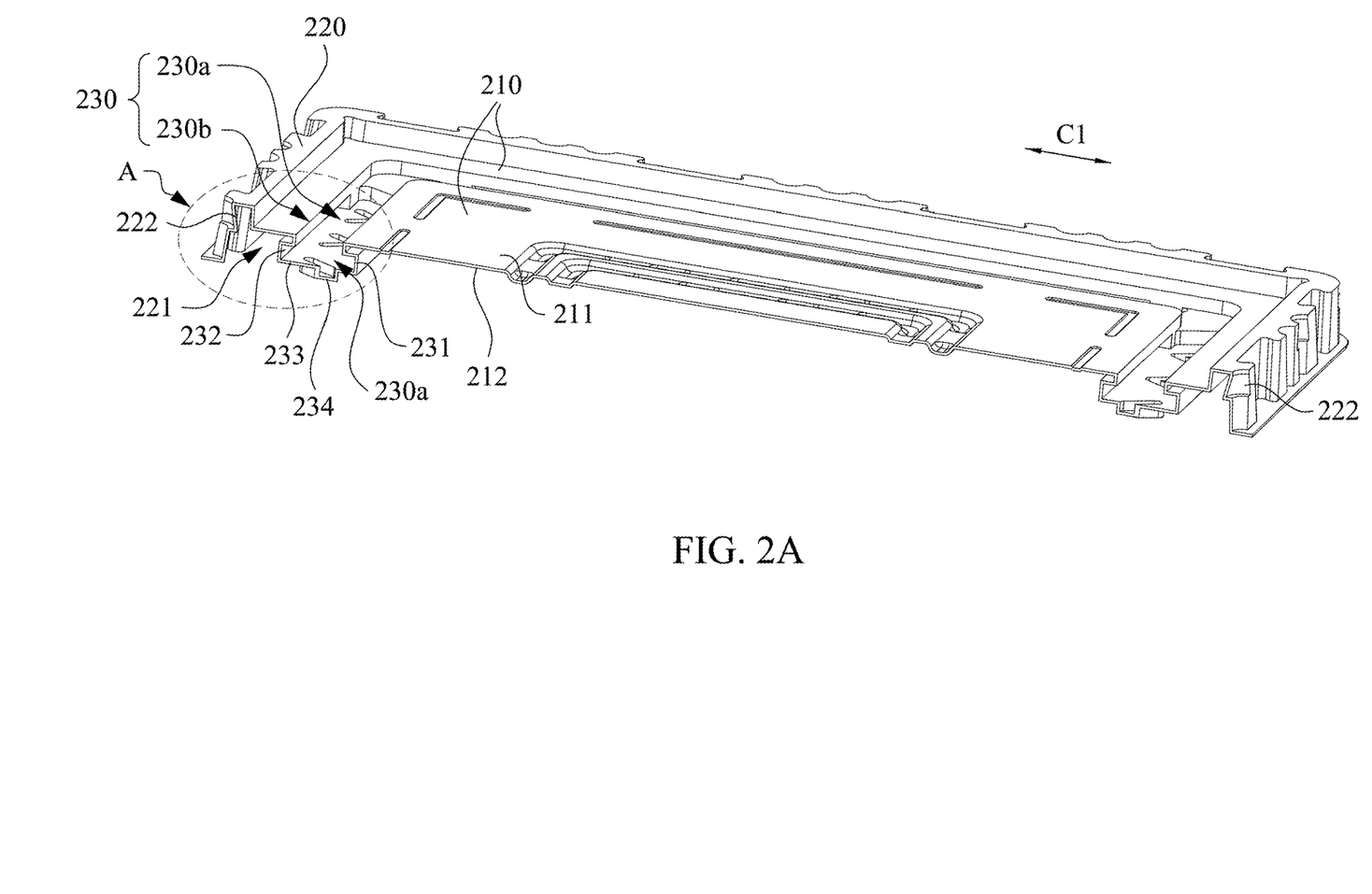
FIG. 2A is a schematic cross-sectional view of a structure of a carrier tray in accordance with an embodiment of the present disclosure.
Figure 2B:
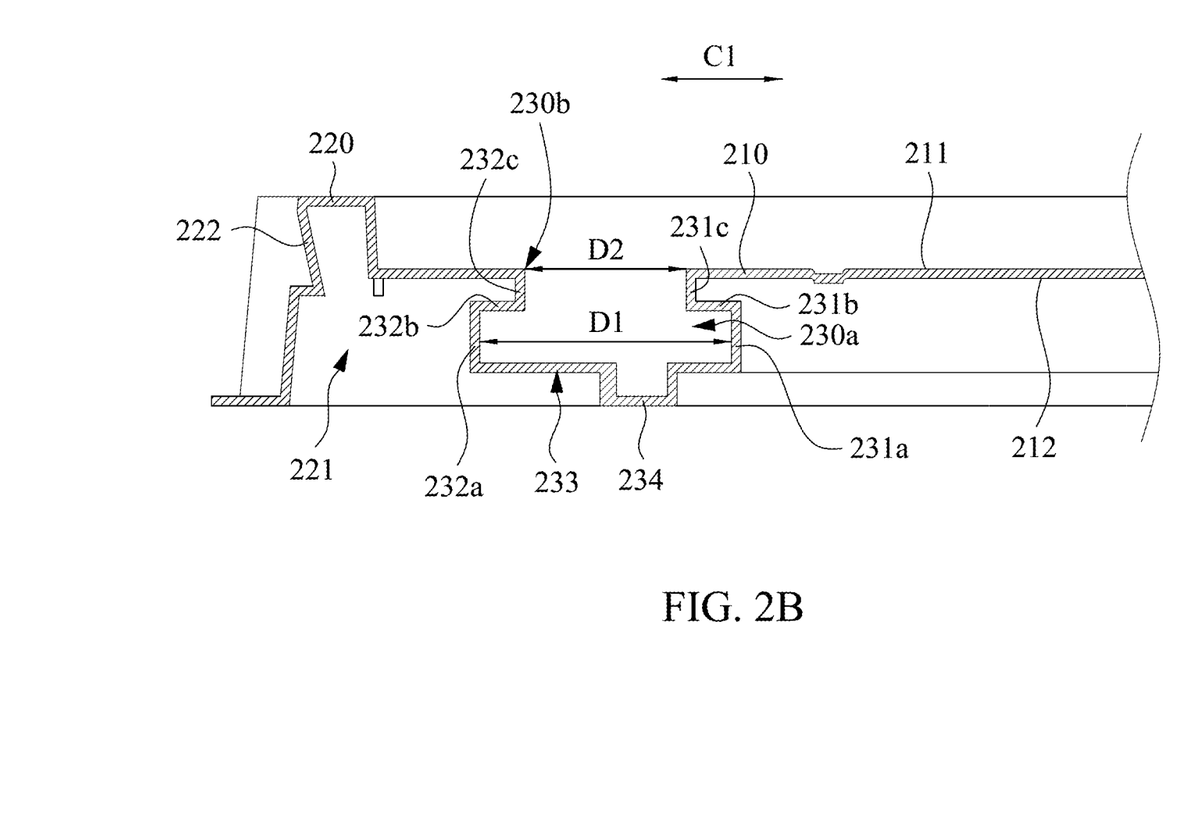
FIG. 2B is an enlarged schematic view of part A in FIG. 2A.
Figure 3:
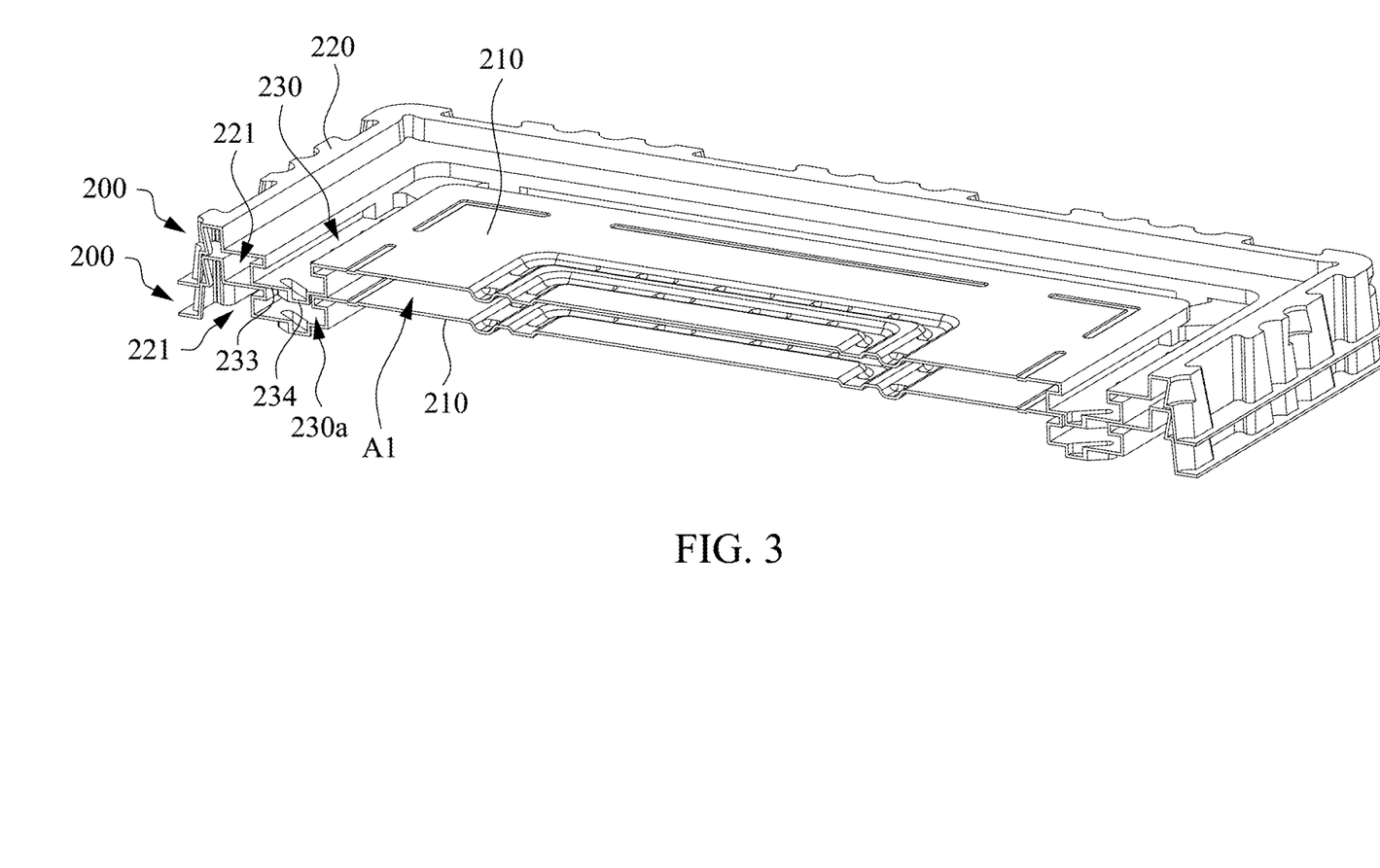
FIG. 3 is a cross-sectional view taken along a line A-A of FIG. 1.

Referring to FIG. 2A to FIG. 4, FIG. 2A is a schematic cross-sectional view of a structure of a carrier tray in accordance with an embodiment of the present disclosure, FIG. 2B is an enlarged schematic view of part A in FIG. 2A, FIG. 3 is a cross-sectional view taken along a line A-A of FIG. 1, and FIG. 4 is a schematic diagram showing a using state of a structure of a carrier tray in accordance with an embodiment of the present disclosure. The carrier tray 200 of the present embodiment includes a carrying portion 210, a surrounding wall 220, and at least one recessed structure 230. The surrounding wall 220 is disposed around the carrying portion 210. In an embodiment, plural alignment portions 222 may be disposed on the surrounding wall 220 to ensure the structure strength of the surrounding wall 220. In another embodiment, plural alignment portions 222 may be disposed symmetrically on opposite two sides of surrounding wall 220, such that operators do not need to consider a direction of fool-proof alignment when picking up empty cattier trays, thereby improving assembling or packaging efficiency of the production line. The recessed structure 230 is recessed into the carrying portion 210. As shown in FIG. 3 and FIG. 4, when two carrier trays 200 are stacked with each other, the carrying portion 210 of the upper carrier tray 200 and the carrying portion 210 of the lower adjacent carrier tray 200 collectively form an accommodating space A1, and the recessed structure 230 of the upper carrier tray 200 is correspondingly stacked with the recessed structure 230 of the lower carrier tray 200. Thus, the carried object B1 can be disposed on the carrying portion 210 of the lower carrier tray 200, and be accommodated in the accommodating space A1, and the protective film B2 covering the carried object B1 can be pressed and limited by the recessed structure 230 of the upper carrier tray 200.

As shown in FIG. 2A and FIG. 2B, the carrying portion 210 has a top surface 211 and a bottom surface 212 opposite to the top surface 211. The recessed structure 230 has a recessed space 230a and an opening 230b, wherein the recessed space 230a is communicated with the outside through the opening 230b. Specifically, the recessed structure 230 has an inner wall 231, an outer wall 232, and a bottom 233, wherein the inner wall 231, the outer wall 232, and the bottom 233 collectively define the recessed space 230a. Furthermore, the outer wall 232 is closer to the surrounding wall 220 than the inner wall 231, the inner wall 231 and the outer wall 232 extend from the carrying portion 210 in a direction away from the bottom surface 212, and the bottom 233 is connected between the inner wall 231 and the outer wall 232. In the present embodiment, a section of the recessed space 230a along a direction C1 has a first distance D1, and a section of the opening 230b along the direction C1 has a second distance D2, wherein the first distance D1 is greater than the second distance D2. In an embodiment, the bottom surface of the recessed structure 230 of the carrier tray 200 is provided with a position limiting structure 234, and the position limiting structure 234 is a convex structure extending in the direction away from the carrying portion 210. Thus, as shown in FIG. 3 and FIG. 4, the bottom 233 of the recessed structure 230 of the upper carrier tray 200 can completely cover the opening 230b of the recessed structure 230 of the adjacent lower carrier tray 200, and can be attached to and be carried on the carrying portion 210 of the lower carrier tray 200. Therefore, the position limiting structure 234 of the upper carrier tray 200 can extend into the recessed space 230a of the lower carrier tray 200, such that the protective film B2 covering the carried object B1 can be pressed into the recessed space 230a. Since the recessed structure 230 of the upper carrier tray 200 is attached downwardly to the carrying portion 210 of the lower carrier tray 200 by a large area pressure in vertical direction, the protective film B2 can be firmly clamped to achieve the objective of limiting the protective film B2.

Moreover, the convex surface of the position limiting structure 234 can be in contact with the protective film B2, and can increase the friction between the convex surface of the position limiting structure 234 and the protective film B2, especially the friction in the horizontal direction to further strengthen the effect of fixing the protective film B2.

Figure 5:
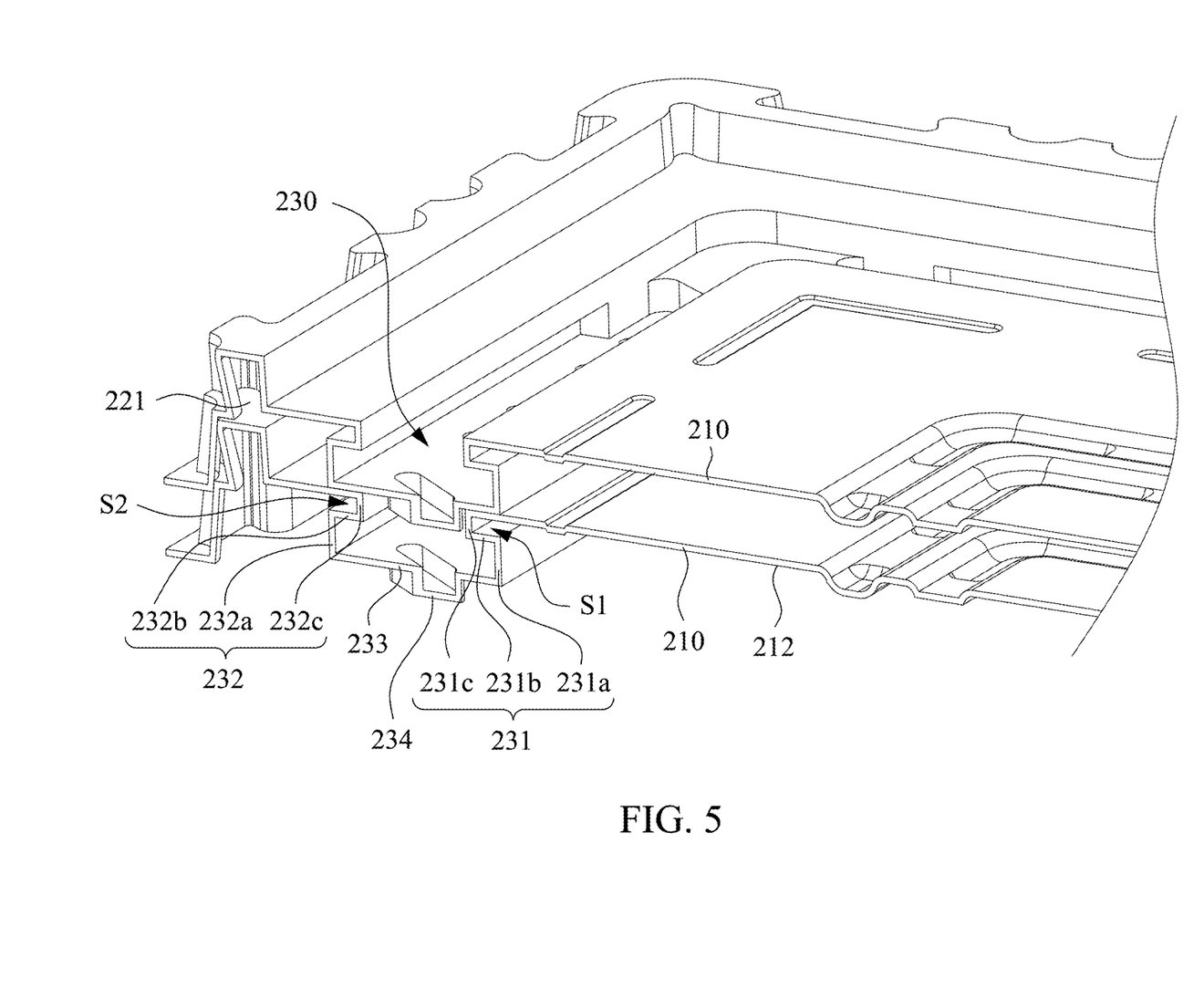
FIG. 5 is a partial cross-sectional view of a carrier tray assembly in accordance with an embodiment of the present disclosure.

Referring to FIG. 2A to FIG. 5 simultaneously, FIG. 5 is a partial cross-sectional view of a carrier tray assembly in accordance with an embodiment of the present disclosure. In an embodiment, the inner wall 231 has a first board portion 231a, a connection portion 231b, and a second board portion 231c, wherein the connection portion 231b connects the first board portion 231a and the second portion 231c. The first board portion 231a of the inner wall 231 is connected to the bottom 233. An end of the connection portion 231b is connected to the first board portion 231a, and another end of the connection portion 231b extends toward the recessed space 230a. The second board portion 231c of the inner wall 231 extends from the carrying portion 210 and is connected to the another end of the connection portion 231b. It can be seen that the inner wall 231 is generally design in an S-shaped stair structure, and the connection portion 231b and the second board portion 231c of the inner wall 231 and the bottom surface 212 of the carrying portion 210 collectively form a first supporting space S1. Similarly, the outer wall 232 has a first board portion 232a, connection portion 232b, and a second board portion 232c, wherein the connection portion 232b connects the first board portion 232a and the second board portion 232c. The first board portion 232a of the outer wall 232 is connected to the bottom 233. An end of the connection portion 232b is connected to the first board portion 232a, and another end of the connection portion 232b extends toward the recessed space 230a. The second board portion 232c of the outer wall 232 extends from the carrying portion 210 and is connected to the another end of the connection portion 232b. That is, the outer wall 232 is generally designed in an S-shaped stair structure, and the connection portion 232b and the second board portion 232c of the outer wall 232 and the bottom surface 212 of the carrying portion 210 collectively form a second supporting space S2.

In the present embodiment, the outer wall 232 and the inner wall 231 are symmetric structures, the second board portion 231c of the inner wall 231 and the second board portion 232c of the outer wall 232 are both connected to the bottom surface 212 of the carrying portion 210. At least one portion of the recessed space 230a is surrounded by the first board portion 231a of the inner wall 231 and the first board portion 232a of the outer wall 232, and the first board portion 231a of the inner wall 231 and the first board portion 232a of the outer wall 232 collectively define the aforementioned first distance D1. The opening 230b is surrounded by at least one portion of the second board portion 231c of the inner wall 231 and at least one portion of the second board portion 232c of the outer wall 232, and the aforementioned second distance D2 can be collectively defined by the second board portion 231c of the inner wall 231 and the second board portion 232c of the outer wall 232. Therefore, with the design that the second distance D2 of the opening 230b is smaller than the first distance D1 of the recessed space 230a, the bottom 233 of the recessed structure 230 of the upper carrier tray 200 can be carried on the carrying portion 210 of the lower carrier tray 200, and the portion of the bottom 233 of the upper recessed structure 230 attached to the carrying portion 210 of the lower carrier tray 200 is located above the first supporting space S1 and the second supporting space S2. It is noted that, by designing each of the inner wall 231 and the outer wall 232 into a generally S-shaped stair structure, in addition to increasing the structure strength and the supporting strength of the inner wall 231 and the outer wall 232, the first supporting space S1 and the second supporting space S2 defined by the S-shaped stair structure can further provide the function of loading, buffering, and shock absorbing.

Figure 6:
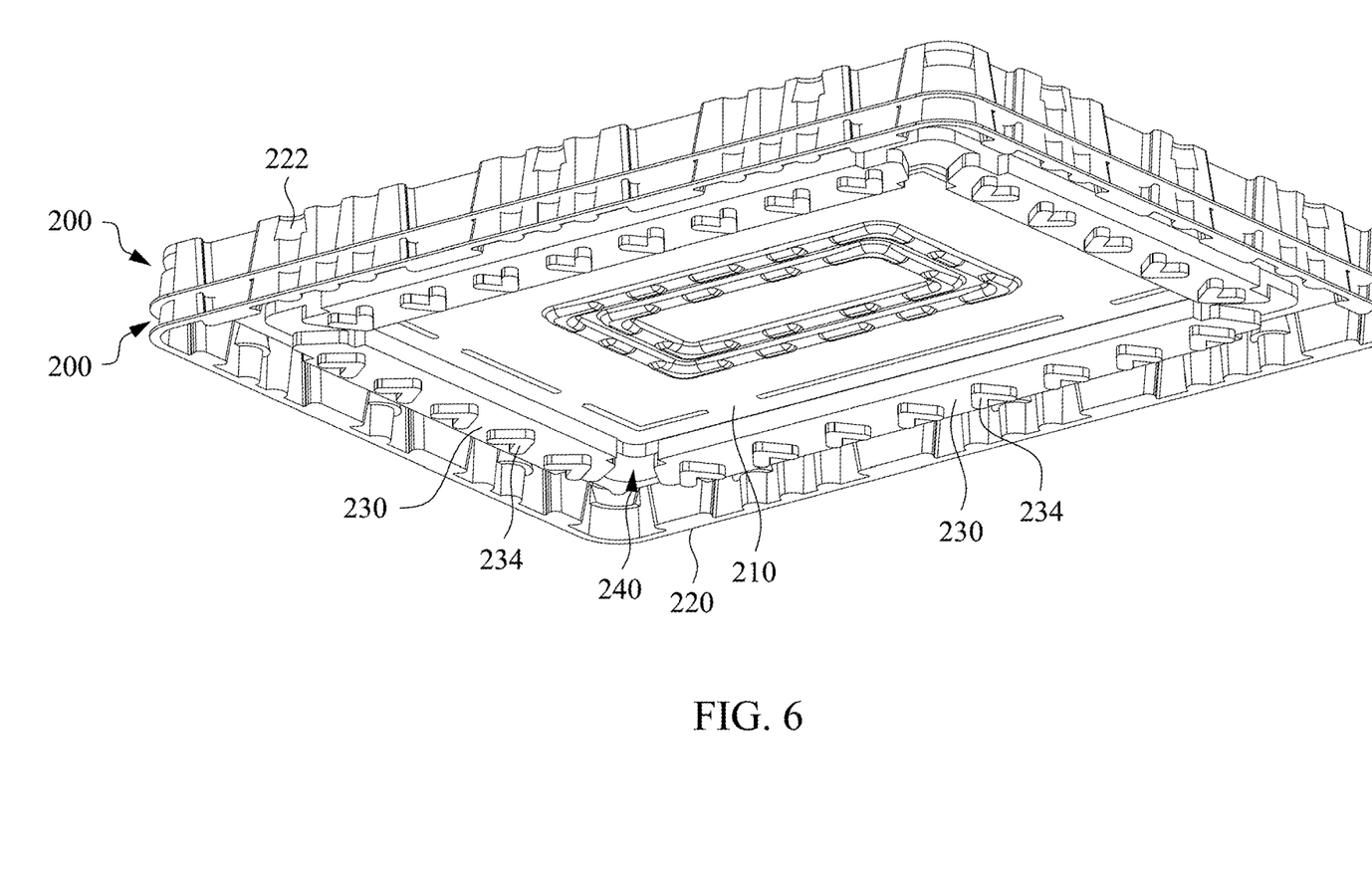
FIG. 6 is schematic diagram showing a structure of a carrier tray assembly in another perspective in accordance with an embodiment of the present disclosure.
Figure 7:
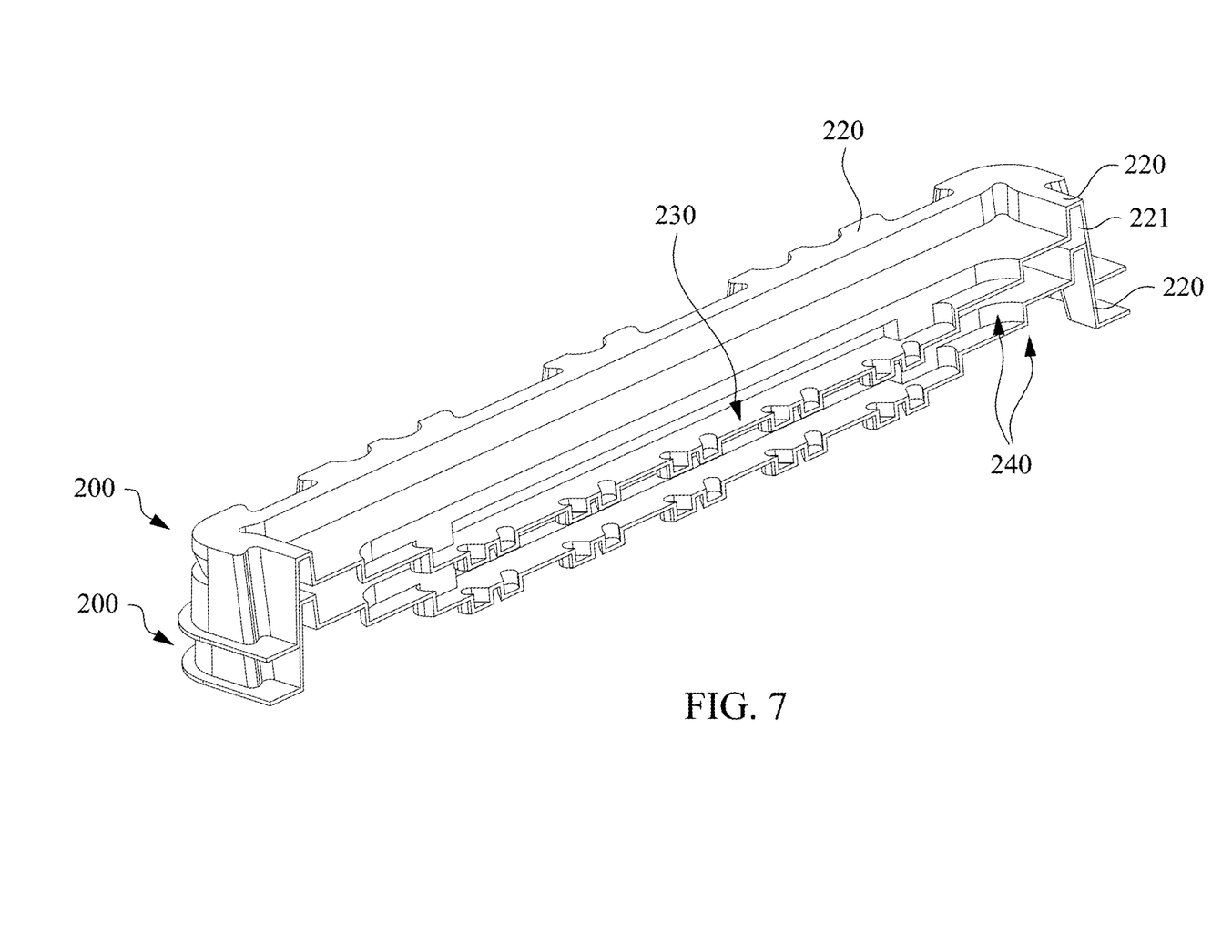
FIG. 7 is a cross-sectional view taken along a line B-B of FIG. 1.

Referring to FIG. 1, FIG. 6, and FIG. 7 simultaneously, wherein FIG. 6 is a schematic diagram showing a structure of a carrier tray assembly in another perspective in accordance with an embodiment of the present disclosure, and FIG. 7 is a cross-sectional view taken along a line B-B of FIG. 1. In an embodiment, the surrounding wall 220 is a bending structure erected on the periphery of the carrying portion 210, wherein the bottom of the surrounding wall 220 has a crooked space 221. As shown in FIG. 7, when two carrier trays 200 are stacked with each other, the surrounding wall 220 of the upper carrier tray 200 covers outside of the surrounding wall 220 disposed on the lower adjacent carrier tray 200, thereby avoiding the problem of the outward expansion of the surrounding wall 220 of the lower carrier tray 200 due to sustaining the weight of objects. In other embodiments, as shown in FIG. 6, viewing from the bottom of the carrier tray 200, an exhausting passage 240 is provided between at least two adjacent recessed structure at the bottom surface of the carrying portions 210, and the exhausting passage 240 is communicated with the crooked space 221 of the surrounding wall 220. The exhausting passages 240 are mainly designed to enable the air to be exhausted to the outside through the exhausting passages 240 and the crooked space 221 when several carrier trays 200 are stacked with each other, to avoid the problem of vacuum absorption caused by the recessed structure 230 of the upper carrier tray 200 completely sealing the accommodating space A1 between the upper carrier tray 200 and the lower carrier tray 200. Furthermore, in the present disclosure, since with the upper position limiting structure 234 extending into the lower recessed structure 230a, the upper and lower carrier trays can be ensured to have the function of mutual limiting, compared with the conventional carrier tray, when stacking the upper and lower carrier trays 200 of the present disclosure, an operator do not need to flip one carrier tray 200 compared with another carrier tray 200 with 180 degrees based on the vertical axis, thereby improving the assembling or packaging efficiency of the production line.

Figure 8:
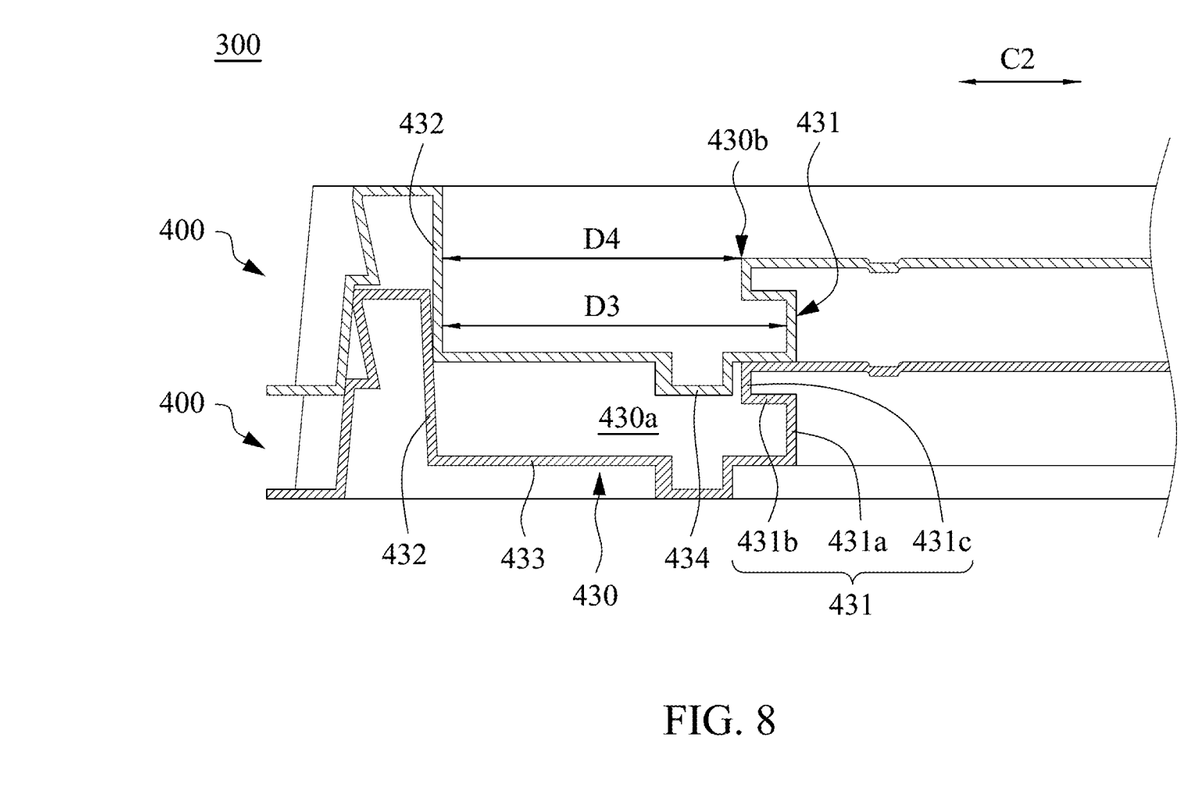
FIG. 8 is a partial cross-sectional view of a carrier tray assembly in accordance with another embodiment of the present disclosure.

In the present disclosure, the recessed structure can also have different structure designs. As shown in FIG. 8, FIG. 8 is a partial cross-sectional view of a carrier tray assembly in accordance with another embodiment of the present disclosure. A carrier tray assembly 300 of the present disclosure is formed by stacking at least two carrier trays 400 on each other. The structure of the carrier tray 400 is substantially the same as the structure of the aforementioned carrier tray 200, and the only difference is that a recessed structure 430 of the carrier tray 400 has a different shape.

As shown in FIG. 8, the recessed structure 430 has a recessed space 430a and an opening 430b, wherein the recessed space 430a is communicated with the outside through the opening 430b. Specifically, the recessed structure 430 has an inner wall 431, an outer wall 432, and a bottom 433, wherein the inner wall 431, the outer wall 432, and the bottom 433 collectively define the recessed space 430a. In the present embodiment, the inner wall 431 is generally design in an S-shaped stair structure, the outer wall 432 is a standing design, and the inner wall 431 includes a first board portion 431a, a connection portion 431b, and a second board portion 431c, wherein the first board portion 431a is connected to the bottom 433. An end of the connection portion 431b is connected to the first board portion 431a, and another end of the connection portion 431b extends toward the recessed space 430a, and the second board portion 431c is connected to the another end of the connection portion 431b. In present embodiment, at least one portion of the recessed space 430a is surrounded by the first board portion 431a, and at least one portion of the opening 430b is formed by surrounding of the outer wall 432 and the second board portion 431c. In the present embodiment, a section of the recessed space 430a along a direction C2 has a first distance D3, and a section of the opening 430b along the direction C2 has a second direction D4, wherein the first distance D3 is greater than the second direction D4. Accordingly, when the two carrier trays 400 are stacked with each other, the recessed structure 430 of the upper carrier tray 400 is correspondingly overlapped with the recessed structure 430 of the lower carrier tray 400, thereby achieving an objective of limiting the position of the protective film of a carried object in the lower carrier tray 400. In other embodiments, the bottom 433 of the recessed structure 430 is provided with a position limiting structure 434, such that when the two carrier trays 400 are stacked with each other, the position limiting structure 434 of the upper carrier tray 400 can extend into the recessed space 430a of the lower carrier tray 400, thereby further pressing the protective film of the carried object in the lower carrier tray 400 into the recessed space 430a to achieve an objective of tightly clamping and limiting the protective film.

It can be known from the embodiments of the present disclosure that the carrier tray of the present disclosure has the recessed structure, and through the design that the second distance of the opening of the recessed structure is smaller than the first distance of the recessed space, the bottom of the recessed structure of the upper carrier tray can be carried on the carrying portion of the lower carrier tray. Therefore, in addition to providing a supporting function when the carrier trays are stacked with each other, the recessed structure further clamps the protective film covering the carried object to greatly increase the clamping area, such that the vertical pressing force is increased, the fixing effect of the protective film is strengthened, and the assembling or packaging efficiency of production lines is further increased correspondingly. Moreover, the position limiting structure can be used as well to be in contact with the protective film and increase the friction between the position limiting structure and the protective film, especially the friction in the horizontal direction to further strengthen the fixing effect of the protective film.

Although the embodiments of the present disclosure have been disclosed above with reference to certain embodiments, they are not used for limiting the embodiments of the present disclosure. For any those skilled in the art, various modifications and variations can be made without departing from the spirit and scope of the embodiments of the present disclosure. Therefore, the protection scope of the embodiments of the present disclosure should be subject to those defined by the appended claims.

What is claimed is:

1. A carrier tray, comprising:
   a carrying portion having a top surface and a bottom surface opposite to the top surface;
   a surrounding wall disposed around the carrying portion; and
   at least one recessed structure recessed into the carrying portion, the recessed structure having an opening and a recessed space, and the recessed space being communicated with the outside through the opening, wherein a first distance is defined by the recessed space along a first direction, a second distance is defined by the opening along the first direction, and the first distance is greater than the second distance; and
   wherein the recessed structure has an inner wall, an outer wall, and a bottom, and the recessed space is defined by the inner wall, the outer wall, and the bottom collectively, wherein the inner wall and the outer wall extend in a direction away from the bottom surface from the carrying portion, the bottom connects to the inner wall and the outer wall, and the outer wall is closer to the surrounding wall than the inner wall.

2. The carrier tray of claim 1, wherein a bottom surface of the bottom is provided with a position limiting structure, and the position limiting structure extends in a direction away from the carrying portion.

3. The carrier tray of claim 1, wherein at least one of the inner wall and the outer wall further comprises a first board portion, a second board portion, and a connection portion, the connection portion is connected between the first board portion and the second board portion, the first board portion is connected to the bottom, at least one portion of the recessed space is surrounded by the first board portion, an end of the connection portion is connected to the first board portion, an another end of the connection portion extends toward the recessed space, the second board portion is connected to the another end of the connection portion, and at least one portion of the opening is formed by surrounding of the second board portion.

4. The carrier tray of claim 1, wherein
each of the inner wall and the outer wall has a first board portion, a second board portion, and a connection portion connected between the first board portion and the second board portion;
the first board portion of the inner wall is connected to the bottom, an end of the connection portion of the inner wall is connected to the first board portion of the inner wall, an another end of the connection portion of the inner wall extends toward the recessed space, and the second board portion of the inner wall extends from the carrying portion and is connected to the another end of the connection portion of the inner wall;
the first board portion of the outer wall is connected to the bottom, an end of the connection portion of the outer wall is connected to the first board portion of the outer wall, an another end of the connection portion of the outer wall extends towards the recessed space, and the second board portion of the outer wall extends from the carrying portion and is connected to the another end of the connection portion of the outer wall; and
wherein the first distance is defined between the first board portion of the inner wall and the first board portion of the outer wall, and the second distance is defined between the second board portion of the inner wall and the second board portion of the outer wall.

5. The carrier tray of claim 1, wherein
the surrounding wall is a bending structure, and a bottom surface of the bending structure has a crooked space; and
an exhausting passage is between at least two adjacent recessed structures on the bottom surface of the carrying portion, and the exhausting passage is communicated with the crooked space.

6. A carrier tray assembly, comprising at least two carrier trays stacked with each other, wherein each of the carrier trays comprises:
a carrying portion having a top surface and a bottom surface opposite to the top surface;
a surrounding wall disposed around the carrying portion;
at least one recessed structure recessed into the carrying portion, the recessed structure having an opening and a recessed space, and the recessed space being communicated with the outside through the opening, wherein a first distance is defined by the recessed space along a first direction, a second distance is defined by the opening along the first direction, and the first distance is greater than the second distance; and
wherein the recessed structure of one of the carrier trays is correspondingly stacked with the recessed structure of the adjacent carrier tray;
wherein the surrounding wall is a bending structure, and a bottom surface of the bending structure has a crooked space;
an exhausting passage is between at least two adjacent recessed structures on the bottom surface of the carrying portion and the exhausting passage communicates with the crooked space; and
the surrounding wall of one of the carrier trays is disposed around the surrounding wall of the adjacent carrier tray.

7. The carrier tray assembly of claim 6, wherein
the recessed structure has an inner wall, an outer wall, and a bottom, the recessed space is defined by the inner wall, the outer wall, and the bottom collectively, wherein the inner wall and the outer wall extend in a direction away from the bottom from the carrying portion, the bottom connects the inner wall and the outer wall, and the outer wall is closer to the surrounding wall than the inner wall; and
the bottom of the recessed structure of one of the carrier trays is attached to the carrying portion of the adjacent carrier tray.

8. The carrier tray assembly of claim 7, wherein a bottom surface of the bottom of the recessed structure of each of the carrier trays is provided with a position limiting structure, and the position limiting structure of the recessed structure of one of the carrier trays extends in a direction away from the carrying portion and is located in the recessed space of the recessed structure of the adjacent carrier tray.

9. The carrier tray assembly of claim 7, wherein
at least one of the inner wall and the outer wall further comprises a first board portion, a second board portion, and a connection portion, the connection portion is connected between the first board portion and the second board portion, the first board portion is connected to the bottom, at least one portion of the recessed space is surrounded by the first board portion, an end of the connection portion is connected to the first board portion, an another end of the connection portion extends toward the recessed space, the second board portion is connected to the another end of the connection portion, and at least one portion of the opening is formed by surrounding of the second board portion; and
wherein the connection portion, the second board portion, and the bottom surface of the carrying portion collectively form a supporting space, and a portion of the bottom of the recessed structure of one of the carrier trays that is attached to the carrying portion of the adjacent carrier tray is located above the supporting space.

10. The carrier tray assembly of claim 7, wherein
each of the inner wall and the outer wall comprises a first board portion, a second board portion, and a connection portion connected between the first board portion and the second board portion;
the first board portion of the inner wall is connected to the bottom, an end of the connection portion of the inner wall is connected to the first board portion of the inner wall, an another end of the connection portion of the inner wall extends toward the recessed space, and the second board portion of the inner wall extends from the carrying portion and is connected to the another end of the connection portion of the inner wall;
the first board portion of the outer wall is connected to the bottom, an end of the connection portion of the outer wall is connected to the first board portion of the outer wall, an another end of the connection portion of the outer wall extends towards the recessed space, and the second board portion of the outer wall extends from the carrying portion and is connected to the another end of the connection portion of the outer wall;
wherein the first distance is defined between the first board portion of the inner wall and the first board portion of the outer wall, and the second distance is defined between the second board portion of the inner wall and the second board portion of the outer wall; and the bottom of the recessed structure of one of the carrier trays completely covers the recessed space of the adjacent carrier tray.

11. The carrier tray assembly of claim 7, wherein each of the inner wall and the outer wall comprises a first board portion, a second board portion, and a connection portion connected between the first board portion and the second board portion;

the first board portion of the inner wall is connected to the bottom, an end of the connection portion of the inner wall is connected to the first board portion of the inner wall, an another end of the connection portion of the inner wall extends toward the recessed space, and the second board portion of the inner wall extends from the carrying portion and is connected to the another end of the connection portion of the inner wall;

the first board portion of the outer wall is connected to the bottom, an end of the connection portion of the outer wall is connected to the first board portion of the outer wall, an another end of the connection portion of the outer wall extends towards the recessed space, and the second board portion of the outer wall extends from the carrying portion and is connected to the another end of the connection portion of the outer wall;

wherein the first distance is defined between the first board portion of the inner wall and the first board portion of the outer wall, and the second distance is defined between the second board portion of the inner wall and the second board portion of the outer wall; and wherein the connection portion and the second board portion of the inner wall and the bottom surface of the carrying portion collectively form a first supporting space, the connection portion and the second board portion of the outer wall and the bottom surface of the carrying portion collectively form a second supporting space, wherein a portion of the bottom of the recessed structure of one of the carrier trays that is attached to the carrying portion of the adjacent carrier tray is located above the first supporting space and the second supporting space.

12. The carrier tray assembly of claim 6, wherein the carrying portion of one of the carrier trays and the carrying portion of the adjacent carrier tray collectively form an accommodating space.

13. A carrier tray assembly, comprising at least two carrier trays stacked with each other, wherein each of the carrier trays comprises:

a carrying portion having a top surface and a bottom surface opposite to the top surface;

a surrounding wall disposed around the carrying portion;

at least one recessed structure recessed into the carrying portion, the recessed structure having an opening and a recessed space, and the recessed space being communicated with the outside through the opening, wherein a first distance is defined by the recessed space along a first direction, a second distance is defined by the opening along the first direction, and the first distance is greater than the second distance; and wherein the recessed structure of one of the carrier trays is correspondingly stacked with the recessed structure of the adjacent carrier tray; and wherein the carrier tray assembly further comprises a protective film, wherein the protective film is configured to cover a carried object located on the carrier tray, and the protective film located on one of the carrier tray is pressed and restrained by the recessed structure of the adjacent carrier tray.

14. The carrier tray assembly of claim 13, wherein a bottom surface of the bottom of the recessed structure of each of the carrier trays is provided with a position limiting structure, and the position limiting structure of the recessed structure of one of the carrier trays is located in the recessed space of the recessed structure of the adjacent carrier tray and is in contact with the protective film located on the adjacent carrier tray.

\* \* \* \* \*